Jan. 7, 1964     G. D. WEBBER     3,117,178
OPTICAL POLYGONS
Filed Nov. 3, 1959
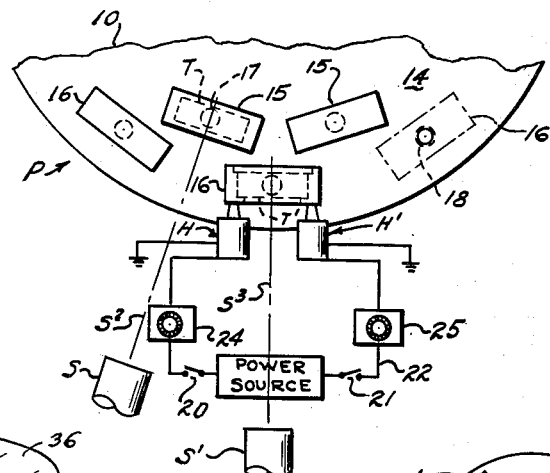
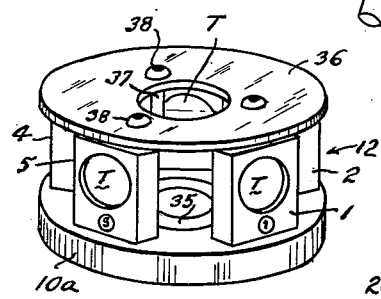
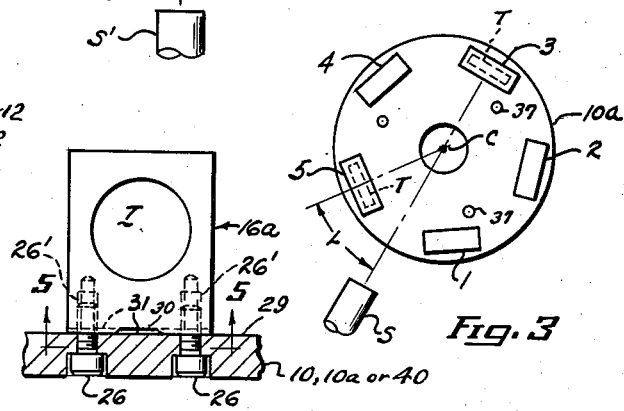
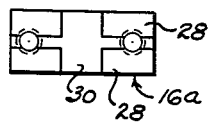
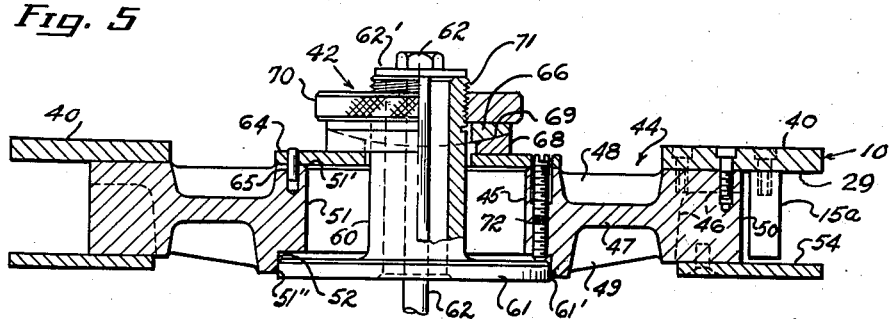
INVENTOR.
GEORGE D. WEBBER
BY
ATTORNEY United States Patent Office 3,117,178
Patented Jan. 7, 1964

3,117,178
OPTICAL POLYGONS
George D. Webber, Lakewood, Ohio, assignor, by mesne assignments, to The L. S. Starrett Company, Athol, Mass., a corporation of Massachusetts
Filed Nov. 3, 1959, Ser. No. 850,582
1 Claim. (Cl. 88—73)

The present invention relates to a high fidelity optical angle measuring or indicating instrument, and is of an already known type called an optical polygon. Such instruments are useful in calibrating high precision mechanisms such as dividing heads and rotary dividing tables and in checking the functioning of inertial guidance systems. They are used in a known manner to reflect light beams from suitable sources at predetermined angles (usually through collimators or equivalents thereof), as in order to enable placement of machine components and other devices, as about a predetermined axis or center, with very much greater accuracy than can be accomplished by employment of angle gage blocks and of course sine bars and instruments which basically are protractors.

Optical polygons, so far as I know, have been made heretofore from solid pieces of optical glass suitably mirrorized. The number of facets or targets on a given optical polygon determines the number of angle measurements or indications that can be accomplished directly with or by it. Further division, if required, is done via auxiliary instruments.

In the construction of optical polygons made of glass it has proven impracticable, especially when numerous facets or light targets are required, to manufacture all the target surfaces with guaranteed substantially absolute accuracy. The manufacturer therefore has adopted the practice of indicating, as on labels or the like in association with certain ones of the target faces, any detected error and its direction relative to adjacent target faces rather than undertaking attempted correction by resurfacing which, when attempted, can and frequently does produce greater errors or in other words is hazardous. Such acknowledgedly imperfect optical polygons are nevertheless practicably usable for most precision angle measurement operations (using all the target faces on the polygon) because, during use, error "correction" can be accomplished by adjustment of the light projecting (e.g. collimator) instruments used with the polygons. Unfortunately the necessary "corrective" adjustment, via such collimator instruments, leads or is likely to lead to unpredictable errors because of requiring use of micrometer type screw threads, hence some lost motion or lash between adjusting manipulations in the necessary directions. Optical polygons made from glass can be easily damaged (e.g. scratched or fractured) and their reflecting surfaces require protective coatings which, being also light reflective, can produce an indistinct image (secondary reflection).

The present invention, indicating one object thereof, enables optical polygons of extremely high fidelity to be produced economically and with a much greater degree of guaranteed permanent accuracy than was possible or practicable by previous methods known to me. It has several other objects and advantages as will be explained.

Essentially the present invention contemplates making the target elements or facets of directly light-reflective and highly abrasive resistant material (needing no coating): mounting the target elements on individual rigid supports (mounting blocks) capable of adjustment on a fiducially flat surface of a stable base; then moving the supports (mountings) into the positions necessary to correlate the various facets in equiangular relationships, and finally firmly locking or fixing the supports or mounting blocks in adjusted position on the base. For coplanar direction of the various facets in respect to the work the base has suitable provision for orientation by simple universal or leveling adjustment. Additionally, in odd number optical polygons (e.g. pentagons) the angle measuring capacity of the instrument for a given quantity of components may be doubled. Whenever a larger number of targets or facets are required than can be accommodated in a single circumferential row without sacrifice of target area the mounting blocks are located on the frame assembly in a plurality of circumferential rows, alternate mountings for example radially overlapping each other without obscuring the targets.

While the preferred material used for making the targets or facets is sintered chromium carbide (e.g. made as circular discs), other materials of its class capable of being mirror finished (e.g. selected from lists given in Ceramic Data Book 1958–1959, Industrial Publications Inc. pages 590 and 591), can be used.

In the accompanyng drawing
FIG. 1 is a diagram showing the relative position of two rows of target mounting blocks on a base or frame of the present instrument and suitable apparatus operative initially to set and adjust the mounting blocks precisely in proper angular relationship on the base surface.

FIG. 2 is a perspective view of one form of the present instrument having an odd number of target faces (five as shown).

FIG. 3 is a diagrammatic plan view showing the instrument of FIG. 2 in use.

FIG. 4 is a front elevation of a typical target mounting block and reflector assembly.

FIG. 5 is a bottom plan view of the mounting block according to FIG. 4.

FIG. 6 is a reduced scale central vertical sectional fragmentary view of the instrument frame assembly and leveling and locking means therefor.

The present optical polygon instrument P, P' etc. can operate in any conceivable position, hence terms horizontal, top, bottom, etc., are used only for convenience and to simplify descriptive reference.

In FIG. 1, 10 indicates diagrammatically the main circular metallic body member or plate of a typical frame assembly of instrument P corresponding to annular member 10a of assembly 12, FIG. 2. Body member or plate 10 is assumed to have a fiducially finished flat top surface 14. Two rows of mounting blocks 15 and 16 for the targets T and T' are shown in FIG. 1, and the table or plate has attaching-screw-receiving holes 17 and 18 accurately and uniformly spaced apart angularly about the vertical axis or center C of the table 10 established as by a suitable arbor (not shown) about which the table can rotate during manufacture of the instrument. In the arrangement of target mounting blocks 15 and 16 shown by FIG. 1 the targets of each row are 36 degrees apart or so that the increments of angular measurement are 18 degrees.

No unusual degree of accuracy is required as to circumferential placement about the center C of the table since only the angular relationship of the various target faces (two targets T and T' being shown in dotted lines) is important. Thus the distances of each row of mounting blocks from the table center can vary within fairly wide limits.

The mounting blocks 15 and 16 as shown in FIG. 1 are attached loosely by single mounting or holding screws (not shown in FIG. 1, one in each hole 17 or 18) which, while not being the usually practiced arrangement, is adequate, as will be shown, and allows the screws to function individually and temporarily as pivots for the blocks 15 and 16, thereby simplifying the apparatus used for adjustment of the angular positions of the target faces. Two screws (see FIGS. 4 and 5) are usually used since they can be made longer without having to increase the wall thickness of the bottom portions of the target mounting blocks.

End or light-beam-projecting portions of two collimator type instruments S and S' are shown in FIG. 1, assumed mounted with their respective tighting axes $S^2$ and $S^3$ intersecting at center C. Instruments S and S' have micrometrically adjustable and magnifying eyepiece mechanisms of known type (not shown) which are used to orient the instruments S and S' so that their reference or dial lines (not shown) read zero when axes $S^2$ and $S^3$ are substantially exactly in the required angular relationship and intersect at center C.

Assuming the position of target T, FIG. 1, has been established by the use of collimator S, and that the mounting block 15 has been securely fastened to the table 10 of instrument P, target T may now be used as reference fiducially to position target T', hence, successively, all the other targets of the instrument P.

The target mounting blocks 15 and 16 may be adjusted (tapped) manually into their required angular positions. As shown however, vibratory percussion mechanisms or instruments H and H' on suitable repositionable supports (not shown) are assumed to be electromagnetically operated against suitable biasing springs as by A.C. current of suitable cycle, and individually controlled as by manually button-operated switches 20 and 21 in circuit 22. Suitable known types of instruments 24 and 25 (e.g. potentiometers) in the circuit can be used to vary the operation of mechanisms H and H' forcewise, so that less and less force or impact is imparted to the mounting blocks 15 and 16 as they are being moved nearly to the required positions (zero positions as shown on the collimator dial).

One reason why a single screw can be safely used to clamp the respective target mounting blocks 15 and 16 in fiducially adjusted positions will be brought out in reference of FIGS. 4 and 5 showing a mounting block (16a since it has two mounting screws 26 threaded into the block 16a as at 26'). Target T, FIG. 4, represents (as preferred) a circular disc of chromium carbide accurately finished on both main parallel faces and held by a suitably threaded bezel (not shown) tightly against a fiducially finished annular seating surface formed in the block 16 exactly perpendicular to lapped base surfaces 28 on the bottom of the block.

The top face 29 of plate or table 10 (FIG. 4) is finished (e.g. optically flat) so that the reflecting faces of all discs T are at right angles to the table surface 29 when the surfaces 28 and 29 are in tight face-to-face contact. The opposite or light reflecting faces of the targets T are finished parallel to each other with the kind of technique known to manufacturers of top grade gage blocks, but, in case the number of target faces in instrument P or P' is even (as in FIG. 1), the targets T or T' would not require mirror finish on both sides but only on the radially outwardly exposed or directed side.

FIGS. 4 and 5 show (highly exaggeratedly) a relief area 30 (cruciform as shown in FIG. 5), a few thousandths of an inch deep and defined by the plateau or land area surface portions 28 of which four are shown for contact with table surface 29. The relief area thereby establishes a predetermined shallow clearance space 31, FIG. 4 which—as will be evident from FIG. 5—is intersected by the clearance spaces around the hold down screws 26. After the screws 26 have been initially lightly tightened (or fully tightened) to hold the block 16a in properly adjusted position, bonding material (e.g. epoxy cement) is injected into the clearance space 31.

Epoxy cement is identified above as an example of adhesive substances capable of penetrating intercrystalline spaces or pores in most metals, so that its bonding action is comparable to welding of metals together.

Final tight setting of the screws 26 is usually done before the epoxy cement has been injected into the clearance space 31 from whence it flows under the land or plateau faces (e.g. via finish scratches); and then all the reflecting faces are rechecked optically before the cement is applied. Torque applied to the screws 26 does not tend to move the mounting blocks out of adjusted position, once the screws are "finger tight," because the land faces 28 of the blocks prevent dislocation by friction against the table or plate surface 29. The land surfaces 28 can be purposely superficially roughened (not shown) to encourage flow of epoxy cement thereunder.

While many, properly seasoned metals can be used to form the plate or table 10 and target mounting blocks 15 and 16 the preferred material for both is tool steel. Electrolytically dissimilar metals for those two parts and other relatively adjacent parts of the instrument (e.g. brass and steel) are avoided in view of the possibility of electrolytic action which could displace the parts out of proper position.

Referring further to FIG. 1, it will be evident that by placing the target mounting blocks 15 and 16 in two rows, alternately disposed in relatively overlapped radial arrangement at their target-framing marginal portions, it is possible fully to expose radially outwardly the entire reflecting faces of all the targets T and T' of ample areas (diameters), whereas a single circular row arrangement of mounting blocks of a given size would (with so many targets for example as 20 to 36) have required a much larger diameter of table 10. In the case of the optical pentagon of FIGS. 2 and 3 (and usually when no more than 12 targets are required) the mounting blocks occupy a single circular row on the plate or table 10.

In FIG. 2 the table 10a supports the target and mounting block assemblies (targets 1 through 5, cm. Fig. 3) as already described, a central mounting piece for an arbor (not shown) being indicated at 35. A circular guard plate 36 is secured to the table 10a, overhanging the target mounting blocks, as by stiff metal columns two of which are shown at 37. The assembly is held together by suitable scews 38 coaxial with the columns 37. The construction according to FIG. 2 is illustrated diagrammatically in FIG. 3, only to show that, by turning the table 10a (or collimator instrument S) about the center C to ten positions through angles L, the five targets (which in case of even-number-sided optical polygons would measure or indicate only the number of angles corresponding to the number of targets) doubles the number of available angular measuring or indicating positions per target and block assembly. The targets T in FIGS. 2 and 3 have of course to be mirror-finished on both sides and spaced to expose all the target faces.

As already noted, the targets hereof when made of chromium carbide or similarly stable corrosion and abrasion resistant material are much superior to mirrored glass targets made as facets since no coating such as customarily used on optical glass mirrors is required. Optically, targets T are "first surface" mirrors which makes them more definitely reflect light than mirrored glass surfaces (assuming coatings).

In FIG. 6 mounting-block-supporting table 10 is partially shown (half scale) in the form of a flat ring 40, made for example of tool steel, and finished as already described. The proportions are those of a 36 sided optical polygon, i.e., for angle measurement increments of 10 degrees. Ring 40 supports the target mounting blocks 15 and 16 (one shown at 15a) on its under side. The construction according to FIG. 6 is principally to illustrate a leveling device 42 and a rigid one piece annular supporting bed or base casting 44 for the ring 40 to which base casting the ring is secured as by suitable screws not shown.

Bed or base casting 44 is preferably ferrous (particularly if the ring 40 is of tool steel) and is made similarly to a disc wheel, having a hollow hub or hub portion 45; a rim portion 46 of structural angle shape in cross section; a web portion 47 with radial or spoke-like reinforcing flanges 48 and 49. Additional radial flanges 50 are provided on and outwardly from the rim portion 46 to which the target supporting table ring or plate 40 is secured. Central cylindrical bore 51 of the hub is counterbored as at 52. Guard ring or plate 54 for the target mounting blocks is suitably attached as by screws (not shown) to several of the flange portions 50, in underhanging relationship to all of the target mounting blocks.

The leveling device or mechanism 42 comprises, as shown, a tubular column member 60 having a circular flange portion 61 whose bottom surface is adapted to rest on a flat surface of the work body (e.g. dividing head or table frame) and to be clamped thereagainst as by a stud and washer assembly 62, 62'. The stud 62 extends loosely through the column member 60. The outer peripheral surface 61' of the flange 61 pilots the casting 44 in reference to counterbore 52 to center it generally on whatever axis may be necessary in respect to the targets. An annular leveling plate 64 loosely surrounding the column member 60 is suitably attached to the hub 45 as by a series of dowel pins one of which is shown or indicated at 65. Leveling washers 66 and 68 with complementary truncated spherical surfaces at 69 loosely surround the column 60 so that they can be tilted and/or moved universally as necessary within appropriate limits; and a suitably knurled hand nut 70 threaded as at 71 on the tubular column 60 serves, temporarily at least, to clamp the leveling washer assembly 66–68 together and against the plate 64 to hold the optical polygon targets with their principal plane in proper relationship to a reference surface or series of indicator points in a plane parallel thereto. After locking the leveling washers as just described the plane of operation of the targets is securely established by seating or setting of three generally vertical set screws 72, spaced apart 120' relative to the center of the instrument. One set screw 72 is shown in FIG. 6 as threaded into the casting 44 in position to be seated against the flange 61.

The bore 51 of the hub 45 of bed casting 44 is chamfered as at 51' and 51'', and the chamfers may be used in cooperation with accurately located center-establishing frusto-conical members (not shown) in order to correlate the target mountings with any critical reference center. The hub 45 or its central bore 51 may centrally support any suitable rotary bearing assemblage for positioning of targets as in FIG. 1 or if, during use, it is desired to turn the polygon unit in reference to the work about an established or critical center or axis.

I claim:

An optical polygon comprising a plate formed with a flat surface, and an even number of members each provided with a single planar light-reflecting face, said members being mounted on said flat surface to form inner and outer equiangular polygonal circular rows of members, each row of members extending circumferentially about a common center, said faces being perpendicular to radial lines extending from said center and facing outwardly therefrom, the members of the outer row being positioned in circumferentially alternating relation with the members of the inner row, adjacent ones of said members in the outer row being spaced apart a distance less than the widths of the members of the inner row to display a portion of a face of the inner row between them.

References Cited in the file of this patent

UNITED STATES PATENTS

| | | |
|---|---|---|
| 1,105,895 | Eppenstein | Aug. 14, 1914 |
| 1,430,316 | Nichterlein | Sept. 26, 1922 |
| 1,869,512 | Schnobl | Aug. 2, 1932 |
| 2,060,351 | Simjian | Nov. 10, 1936 |
| 2,437,807 | Dowell et al. | Mar. 16, 1948 |
| 2,546,524 | Schipplock | Mar. 27, 1951 |
| 2,619,008 | Fuentes | Nov. 25, 1952 |
| 2,909,204 | Somerville | Oct. 20, 1959 |

FOREIGN PATENTS

| | | |
|---|---|---|
| 568,936 | Great Britain | Apr. 26, 1945 |
| 429,070 | Italy | June 14, 1948 |

OTHER REFERENCES

Recent Developments in the Use of Optics as an Engineering Tool, Young, The Tool Engineer, October 1958, page 4.

Making Precision Measurements with Optical Tools, Moody and Bunch, The Tool Engineer, pages 6 and 7, April 1960.